(12) United States Patent
Mani

(10) Patent No.: US 7,053,754 B2
(45) Date of Patent: May 30, 2006

(54) ANTI-COLLISION METHOD FOR CONTACTLESS ELECTRONIC MODULE

(75) Inventor: Christophe Mani, Cavaillon (FR)

(73) Assignee: STMicroelectronics SA, Montrouge (FR)

( * ) Notice: Subject to any disclaimer, the term of this patent is extended or adjusted under 35 U.S.C. 154(b) by 492 days.

(21) Appl. No.: 10/453,454

(22) Filed: Jun. 3, 2003

(65) Prior Publication Data

US 2004/0012486 A1 Jan. 22, 2004

(30) Foreign Application Priority Data

Jun. 4, 2002 (FR) ................... 02 06831

(51) Int. Cl.
*H04Q 5/22* (2006.01)
(52) U.S. Cl. .................... 340/10.2; 340/10.4
(58) Field of Classification Search ............. 340/10.2, 340/10.31, 10.4, 10.41, 10.32, 10.3, 10.42, 340/10.5; 235/435, 492; 342/44, 42; 370/445
See application file for complete search history.

(56) References Cited

U.S. PATENT DOCUMENTS

| | | | | |
|---|---|---|---|---|
| 5,530,702 A | * | 6/1996 | Palmer et al. | 370/445 |
| 5,539,394 A | * | 7/1996 | Cato et al. | 340/10.32 |
| 6,377,203 B1 | * | 4/2002 | Doany | 342/44 |
| 6,535,109 B1 | * | 3/2003 | Mahdavi | 340/10.3 |
| 6,727,803 B1 | * | 4/2004 | Hulvey | 340/10.31 |
| 6,749,117 B1 | * | 6/2004 | Nakabe et al. | 235/435 |

FOREIGN PATENT DOCUMENTS

| | | |
|---|---|---|
| EP | 01017005 | 7/2000 |
| EP | 01197909 | 4/2002 |
| WO | 99/67737 | 12/1999 |

\* cited by examiner

*Primary Examiner*—Michael Horabik
*Assistant Examiner*—William Bangachon
(74) *Attorney, Agent, or Firm*—Lisa K. Jorgenson; Allen, Dyer, Doppelt, Milbrath & Gilchrist, P.A.

(57) ABSTRACT

An anti-collision method to identify and select contactless electronic modules (MDL) by a terminal is provided. A module may generate a random identification number prior to a communication, and respond to a general or complementary identification request on a time slot that varies according to its identification number. A non-selected module may generate a new random identification number when it receives a complementary identification request. Thus, the time slot of a non-selected module provided in response to a complementary identification request is not statistically the same as its time slot in response to a previous identification request, and it varies according to its identification number (ID).

36 Claims, 6 Drawing Sheets

| C0 | C1 | C2 | C3 | C4 | C5 | C6 | C7 | C8 |
|---|---|---|---|---|---|---|---|---|
| OF | TAG1<br>(P-0)<br>ID=xx<br>(RDY) | TAG2<br>(P-0)<br>ID=xx<br>(RDY) | TAG3<br>(P-0)<br>ID=xx<br>(RDY) | TAG4<br>(P-0)<br>ID=xx<br>(RDY) | TAG5<br>(P-0)<br>ID=xx<br>(RDY) | TAG6<br>(P-0)<br>ID=xx<br>(RDY) | TAG7<br>(P-0)<br>ID=xx<br>(RDY) | TAG8<br>(P-0)<br>ID=xx<br>(RDY) |
| PCALL0 | ID=40<br>(INV)<br>R(40) | ID=13<br>(INV)<br>R(13) | ID=3F<br>(INV)<br>R(3F) | ID=4A<br>(INV)<br>R(4A) | ID=50<br>(INV)<br>R(50) | ID=48<br>(INV)<br>R(48) | ID=52<br>(INV)<br>R(52) | ID=7C<br>(INV)<br>R(7C) |
| PCALL16 | ID=45<br>(INV) | ID=12<br>(INV) | ID=30<br>(INV)<br>R(30) | ID=43<br>(INV) | ID=55<br>(INV) | ID=43<br>(INV) | ID=53<br>(INV) | ID=73<br>(INV) |
| SELECT(30) | (INV) | (INV) | R(30)<br>(SEL) | (INV) | (INV) | (INV) | (INV) | (INV) |
| SLOT-MARKER(1) | (INV) | (INV) | - | (INV) | (INV) | (INV) | (INV) | (INV) |
| SLOT-MARKER(2) | (INV) | (INV)<br>R(12) | - | (INV) | (INV) | (INV) | (INV) | (INV) |
| SELECT(12) | (INV) | R(12)<br>(SEL) | - | (DESEL) | (INV) | (INV) | (INV) | (INV) |
| SLOT-MARKER(3) | (INV) | - | - | (INV)<br>R(43) | (INV) | (INV)<br>R(43) | (INV)<br>R(53) | (INV)<br>R(73) |
| SLOT-MARKER(4) | (INV) | - | - | (INV) | (INV) | (INV) | (INV) | (INV) |
| SLOT-MARKER(5) | (INV)<br>R(45) | - | - | (INV) | (INV)<br>R(55) | (INV) | (INV) | (INV) |
| SLOT-MARKER(i = 6 ⇒ F) | (INV) | - | - | (INV) | (INV) | (INV) | (INV) | (INV) |

FIG. 5A

| C0 | C1 | C2 | C3 | C4 | C5 | C6 | C7 | C8 |
|---|---|---|---|---|---|---|---|---|
|  | TAG1 | TAG2 | TAG3 | TAG4 | TAG5 | TAG6 | TAG7 | TAG8 |
| PCALL16 | ID=40 | - | - | ID=41 | ID=53 | ID=42 | ID=50 | ID=74 |
|  | R(40) | - | - | (INV) | (INV) | (INV) | R(50) | (INV) |
| SLOT-MARKER(1) | (INV) | - | - | (INV) | (INV) | (INV) | (INV) | (INV) |
|  | (INV) | - | - | R(41) | (INV) | (INV) | (INV) | (INV) |
| SELECT(41) | (INV) | - | - | (INV) | (INV) | (INV) | (INV) | (INV) |
|  |  |  |  | R(41) |  |  |  |  |
|  | (INV) | (DESEL) |  |  | (INV) | (INV) | (INV) | (INV) |
|  |  |  |  | (SEL) |  |  |  |  |
| SLOT-MARKER(2) | (INV) | - | - | - | (INV) | (INV) | (INV) | (INV) |
|  | (INV) | - | - | - | (INV) | R(42) | (INV) | (INV) |
| SELECT(42) | (INV) | - | - | - | (INV) | - | (INV) | (INV) |
|  |  |  |  |  |  | R(42) |  |  |
|  | (INV) | - | - | (DESEL) | (INV) |  | (INV) | (INV) |
|  |  |  |  |  |  | (SEL) |  |  |
| SLOT-MARKER(3) | (INV) | - | - | - | (INV) | - | (INV) | (INV) |
|  | (INV) | - | - | - | R(53) | - | (INV) | (INV) |
| SELECT(53) | (INV) | - | - | - | (INV) | - | (INV) | (INV) |
|  |  |  |  |  | R(53) |  |  |  |
|  | (INV) | - | - | - |  | (DESEL) | (INV) | (INV) |
|  |  |  |  |  | (SEL) |  |  |  |
| SLOT-MARKER(4) | (INV) | - | - | - | - | - | (INV) | (INV) |
|  | (INV) | - | - | - | - | - | (INV) | R(74) |
| SELECT(74) | (INV) | - | - | - | - | - | (INV) | - |
|  |  |  |  |  |  |  |  | R(74) |
|  | (INV) | - | - | - | (DESEL) | - | (INV) |  |
|  |  |  |  |  |  |  |  | (SEL) |
| SLOT-MARKER(i = 5 => F) | (INV) | - | - | - | - | - | (INV) | - |
|  | (INV) | - | - | - | - | - | (INV) | - |

FIG. 5B

| C0 | C1 | C2 | C3 | C4 | C5 | C6 | C7 | C8 |
|---|---|---|---|---|---|---|---|---|
|  | TAG1 | TAG2 | TAG3 | TAG4 | TAG5 | TAG6 | TAG7 | TAG8 |
| PCALL16 | ID=41 | - | - | - | - | - | ID=50 | - |
|  | (INV) | - | - | - | - | - | R(50) | - |
| SELECT(50) | (INV) | - | - | - | - | - | (INV) | - |
|  | (INV) | - | - | - | - | - | R(50) | (DESEL) |
|  |  |  |  |  |  |  | (SEL) |  |
| SLOT-MARKER(1) | (INV) | - | - | - | - | - | - | - |
|  | R(41) | - | - | - | - | - | - | - |
| SLOT-MARKER(2) | (INV) | - | - | - | - | - | - | - |
|  | (INV) | - | - | - | - | - | - | - |
| SLOT-MARKER(i = 3 => F) | (INV) | - | - | - | - | - | - | - |
|  | (INV) | - | - | - | - | - | - | - |

*FIG. 5C*

| C0 | C1 | C2 | C3 | C4 | C5 | C6 | C7 | C8 |
|---|---|---|---|---|---|---|---|---|
|  | TAG1 | TAG2 | TAG3 | TAG4 | TAG5 | TAG6 | TAG7 | TAG8 |
| PCALL16 | ID=43 | - | - | - | - | - | - | - |
| SLOT-MARKER(1) | (INV) | - | - | - | - | - | - | - |
|  | (INV) | - | - | - | - | - | - | - |
| SLOT-MARKER(2) | (INV) | - | - | - | - | - | - | - |
|  | (INV) | - | - | - | - | - | - | - |
| SLOT-MARKER(3) | (INV) | - | - | - | - | - | - | - |
|  | R(43) | - | - | - | - | - | - | - |
| SELECT(43) | (INV) | - | - | - | - | - | - | - |
|  | R(43) | - | - | - | - | - | (DESEL) | - |
|  | (SEL) |  |  |  |  |  |  |  |
| SLOT-MARKER(i = 3 => F) | - | - | - | - | - | - | - | - |
|  | (SEL) | (DESEL) | (DESEL) | (DESEL) | (DESEL) | (DESEL) | (DESEL) | (DESEL) |

*FIG. 5D*

ANTI-COLLISION METHOD FOR CONTACTLESS ELECTRONIC MODULE

FIELD OF THE INVENTION

The present invention relates to contactless data transmission techniques, particularly by electromagnetic induction, such as for contactless electronic tags, contactless smart cards, and other portable contactless electronic objects. More particularly, the present invention relates to an anti-collision method for identifying contactless electronic modules by a terminal.

BACKGROUND OF THE INVENTION

In contactless applications such as those noted above, several modules are often subject to the "interrogation" field of a terminal at the same time. This situation is represented in FIG. 1, where a terminal TRM is illustratively in the presence of several modules M1, M2, M3, ..., Mn, which are arranged to communicate with the terminal by inductive coupling.

The terminal TRM has a communication interface IT including an antenna coil enabling it to generate a magnetic field FLD to send data to the modules. This is generally done by modulating the amplitude of the magnetic field. The antenna coil also allows data to be received from the modules. The modules M1-Mn are equipped with communication interfaces IM. Each communication interface IM includes an antenna coil enabling it to send data to the terminal, typically by charge modulation (attenuation of the magnetic field by short-circuiting the antenna coils), and to receive the data sent by the terminal.

In the configuration illustrated in FIG. 1, the terminal needs to establish communications with each of the modules to perform an intended operation. For example, such operations may include monetary transactions, identification and/or authentication operations (i.e., access control), a toll collection operation, or an identification operation without authentication (e.g., taking an inventory). Communications with a given module should be confined to that module. That is, such communications should not be interrupted by messages from other modules. Otherwise, such message collision results in the terminal receiving errant messages.

Generally speaking, the terminal does not know the identity of the modules present in its interrogation field. As such, it is generally not possible for the terminal to send a particular message to a particular module that would enable this module to be made active while causing the others to be silent.

The above-described problems are typically addressed through the use of anti-collision methods. Such methods generally require that the modules each have a specific identification number which allows them to be differentiated from one another by the terminal.

Two general types of prior art anti-collision methods are determinist methods and probabilistic methods. According to determinist methods, the terminal sends marking commands for marking out time slots (i.e., response positions) on a time scale (i.e., temporal response scale) which includes $2^N$ time slots. Each module sends an identification message including its identification number when a time slot corresponding to the first N bits of its identification number is reached. When a module is the only one to respond on a time slot, the terminal identifies it and can select it.

If two modules respond on the same time slot, this means that the first N bits of their identification number are identical. The terminal detects the collision and sends a nominative complementary identification request including the N bits of the colliding identification numbers. This nominative complementary identification request only relates to the modules colliding on the time slot defined by the N bits specified In response to the nominative complementary identification request, the modules concerned establish a new time slot, this time using the next N bits of their identification number, and send back a new identification message.

The above sequence can be repeated several times until all the modules are identified and/or selected. It may also be repeated for each time slot as many times as the number of sub-groups of N bits remaining to be covered in the identification numbers.

The deterministic identification process has a "tree" structure in that each nominative complementary identification step only relates to the modules colliding on a pre-determined time slot. Therefore, for example, if two first modules have N identical first bits, and two other modules have N identical first bits that are different from the N first bits of the first two modules, the identification of the four modules will require at least two complementary identification steps. That is, one step will be needed to choose between the first two modules, and the second step to choose between the second two modules. In practice, the tree structure of determinist methods can become very complex as the number of modules increases, and the identification of each module requires a rather long processing time.

Anti-collision methods also imply that the modules execute relatively complex algorithms enabling them to find out whether or not they need to respond to a nominative complementary identification request. Furthermore, when the number of modules increases, the risk of two modules having the same identification number increases, which corresponds to a total collision and the impossibility of choosing between two modules. Therefore, the length of the identification numbers has to be increased to reduce this risk.

In addition to providing very long identification numbers, another measure enabling the risk of a total collision to be reduced is that each module generates a random identification number prior to a communication. The identification number is then used by the module for all the successive interrogations until the module is switched off or deactivated. However, the generation of very long random identification numbers requires providing powerful, high-performance random number generators. Yet, such generators are typically quite complex and very costly, and they are also of considerable size in terms of silicon surface are.

A determinist anti-collision method is, for example, recommended by the ISO 14443-3 type B standard, which provides that the modules have identification numbers of 32 bits, which may be random. In summary, the determinist methods provide for tree-type identification of modules, which is complex to implement, relatively slow, and requires high-performance random number generators.

However, the advantage of these methods is that, as the identification of the modules is of a tree type, a substantial number of time slots are not required. For example, by choosing a number N equal to 4 (i.e., four bits), only 16 time slots are needed.

Probabilistic methods can be distinguished from determinist methods in that the time slot of a module is independent of its identification number. The terminal first sends a general identification request that triggers the generation of a random number in the module. This random number determines the time slot of the module to send an identification message including its identification number.

The effectiveness of probabilistic methods, when the number of modules increases, does not depend on the length of the identification numbers (although the need to not have two modules having the same identification number still remains), but on the staggering of the time scale. Therefore, the greater the number of time slots, the more the probabilistic method is effective. In the event of a collision, the non-identified modules receive a non-nominative complementary identification request and determine a new random time slot. As the complementary identification step is not nominative, it relates to modules that have collided on different time slots, unlike the nominative identification steps of determinist methods.

In summary, probabilistic anti-collision methods are easier to implement as far as the algorithms to be loaded into the modules are concerned. Yet, these methods require an extensive time scale to be applicable to a substantial number of modules. On the other hand, if the time scale is extensive, the identification process may prove to be unnecessarily long when a small number of modules is located simultaneously in the interrogation field of the terminal.

By way of example, consider the case where 255 time slots are provided and only two modules are located in the interrogation field of the terminal. It is possible that a module randomly chooses the time slot No. 1 while the other module chooses the time slot No. 255. In this case, after identifying the first module, it is necessary to cover the entire time scale and reach the 255th time slot to identify the second module.

Yet another disadvantage of classical probabilistic methods is that a collision on the identification numbers can occur between two modules that have not responded on the same time slot. The terminal then has to cause the modules to generate new identification numbers and start the identification process again.

SUMMARY OF THE INVENTION

An object of the present invention is to provide a combination of features of both determinist methods and probabilistic methods.

According to the present invention, the identification requests sent by the terminal are not nominative, as is the case with a probabilistic method, but the time slot of a module varies according to the identification number of the module, as in a determinist method. Furthermore, a module generates a new identification number randomly when it responds to a complementary identification request, such that its time slot is random and is not constant, as in a probabilistic method. The identification process is therefore not of the tree type, and it is therefore easier to implement.

Preferably, the time slot only depends on one part of the identification number, as in determinist methods. This may be done so that the time scale may include a small number of time slots if the part of the identification number used to define the time slot includes a small number of bits.

More particularly, the present invention provides an anti-collision method to identify and select contactless electronic modules by a terminal, which may include the following steps. Prior to a communication, a module may generate a random identification number. The terminal may then send a general identification request to trigger the sending of identification messages by the modules. The terminal may also send one or more non-nominative complementary identification requests when identification messages collide. A module may be selected when it receives a select message including its identification number.

In response to a general or complementary identification-request-, a non-selected module may send an identification message including its identification number when it reaches a predetermined time slot on a time scale. Furthermore, a module may also respond to a general or complementary identification request on a time slot that varies according to its identification number. Additionally, a non-selected module may generate a new random identification number when it receives a complementary identification request. This may be done so that the time slot of a non-selected module given in response to a complementary identification request is not statistically the same as its time slot given in response to a previous identification request, and while varying according to its identification number.

In addition, a general identification request may be identical in format and in code to a complementary identification request. Furthermore, a module may determine a time slot that is equal to a predetermined part of its identification number, where the predetermined part includes bits of predetermined rank. More particularly, the rank preferably does not vary when the module responds to successive identification requests.

The predetermined part of the identification number of a module may also include least significant bits of the identification number. Also, to generate a new random identification number, a module may keep a first part of its current identification number, and randomly generate a second part of the identification number. Further, a module may determine a time slot that is equal to the second part of the identification number, and a first part of the identification number of a module may be generated randomly by the module prior to a communication.

In addition, the first part of the identification number of a module may include constant data logged in the module. The terminal may also send a complementary identification request when it receives, in response to a previous complementary identification request, an identification message from a module that is not colliding with another identification message, but which includes an identification number already used by another module.

Further, a module may be automatically activated when it is in the presence of a magnetic field sent by the terminal. It may also generate a random identification number when it is activated. Also, the time slots on the time scale may be marked by marking commands sent by the terminal. A general identification request may be used as a marking command of the first time slot on the time scale. A marking command may also be a time slot number, at least for time slots that are above a first time slot. In addition, the terminal may send marking commands in an order that does not correspond to an ascending rank of the time slots.

The terminal may advantageously only send a complementary identification request after all the time slots of the time scale have been covered. To start a communication, the terminal may send an immediate identification request, to which the modules respond substantially immediately without using the time scale.

A module may have a selected state and a deselected (or deactivated) state to which the terminal may cause it to switch after selection. A module in the selected state or in the deselected state may not respond to a general or complementary identification request.

The present invention also relates to a contactless electronic module including a communication interface or means for sending and receiving messages without contact, and a decoder or means for decoding received messages including at least one of a general identification request, a non-nominative complementary identification request, and a select message. The module may also include means or circuitry for switching to a selected state upon receiving a select message including an identification number of the module.

Moreover, the module may generate a random identification number before a communication. Upon receiving a general or complementary identification request, it may also determine a time slot on a time scale if the module is not in the selected state. When the time slot is reached, it may then send an identification message including the identification number of the module. In response to a general or complementary identification request, it may determine a time slot that varies according to its identification number.

The module may also generate a new random identification number when it receives a complementary identification request. This may be done such that the time slot of the module given in response to a complementary identification request is not statistically the same as its time slot given in response to a previous identification request, and while varying according to its identification number.

The module may also decode a complementary identification request substantially identical in format and in code to a general identification request. Moreover, the module may be arranged to determine a time slot that is equal to a determined part of its identification number, the determined part including bits of predetermined rank. The rank preferably does not vary when the module responds to successive identification requests.

Also, the predetermined part may include least significant bits of the identification number of the module. The module may generate a new identification number by keeping a first part of its current identification number, and by randomly generating a second part of the identification number. Further, the module may determine a time slot equal to the second part of the identification number responsive to a general or complementary identification request.

Additionally, the first part of the identification number of a module may include constant data stored in the module. Furthermore, the first part of the identification number may be generated randomly by the module prior to a communication. The module may also determine a time slot that is equal to the second part of the identification number. Also, the module may switch automatically to an activated state when it is in the presence of a magnetic field of a predetermined frequency, and also generate an identification number when it switches to the activated state.

The module may also decode marking commands sent by the terminal, which enables the module to mark out time slots on the time scale. The module may further decode marking commands including a time slot number, at least for time slots that are above a first time slot. The module may also decode a general identification request as a marking command of a first time slot on the time scale. Additionally, the module may decode an immediate identification request and send substantially immediately, without using the time scale, an identification message in response to an immediate identification request.

The module may have a deselected or deactivated state to which it may switch after being in the selected state. Further, the module may advantageously not respond to a general or complementary identification request when it is in the deselected or deactivated state.

BRIEF DESCRIPTION OF THE DRAWINGS

These and other objects, features and advantages of the present invention will be explained in greater detail in the following description of a non-limiting example of the anti-collision method according to the present invention, and of a non-limiting example of an embodiment of a module for implementing the method according to the present invention, with reference to the following figures, in which:

FIGS. 5A to 5D are tables for an anti-collision sequence according to the present invention including several subsequences.

DETAILED DESCRIPTION OF THE PREFERRED EMBODIMENTS

Figure 1:
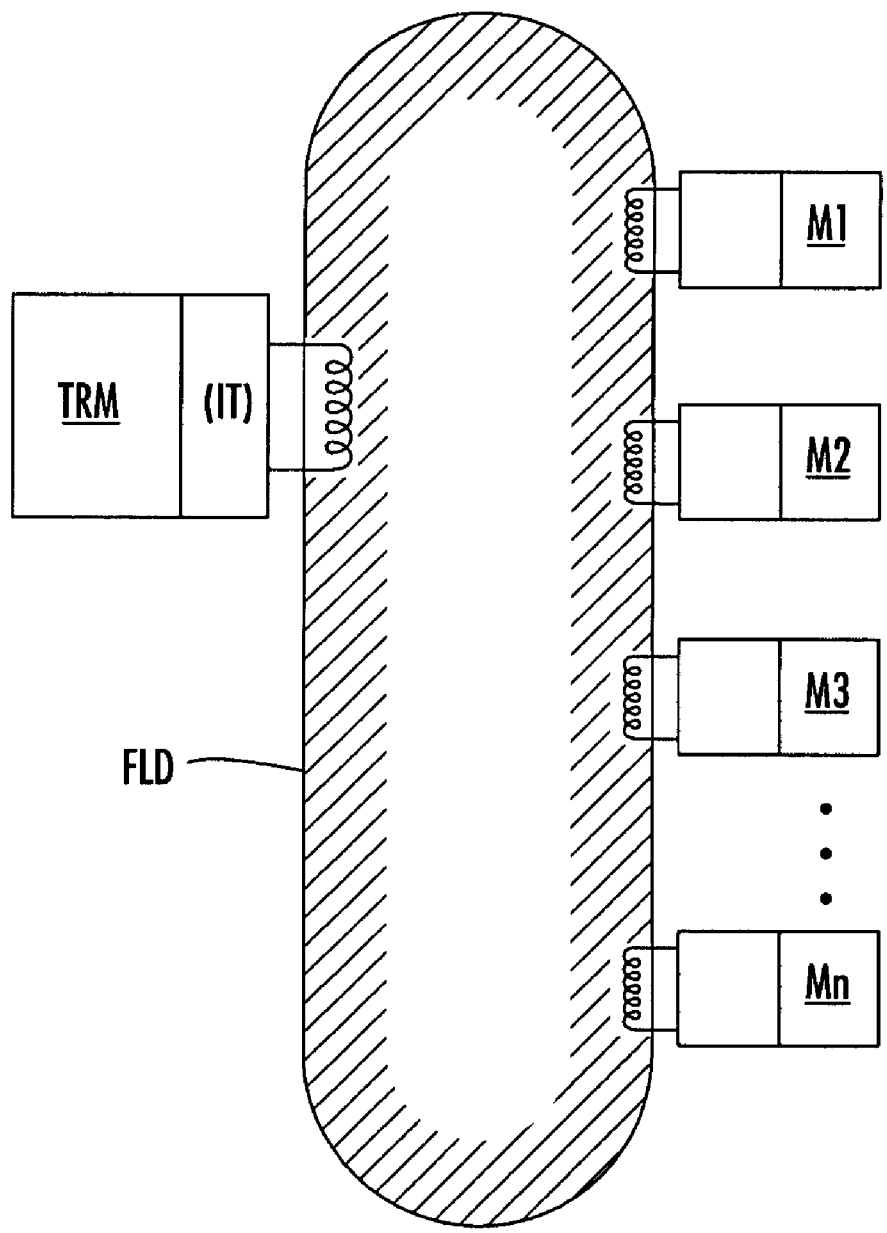
FIG. 1 (previously described) is a schematic block diagram illustrating several contactless modules all present within the interrogation field of a terminal in accordance with the prior art.
Figure 2:
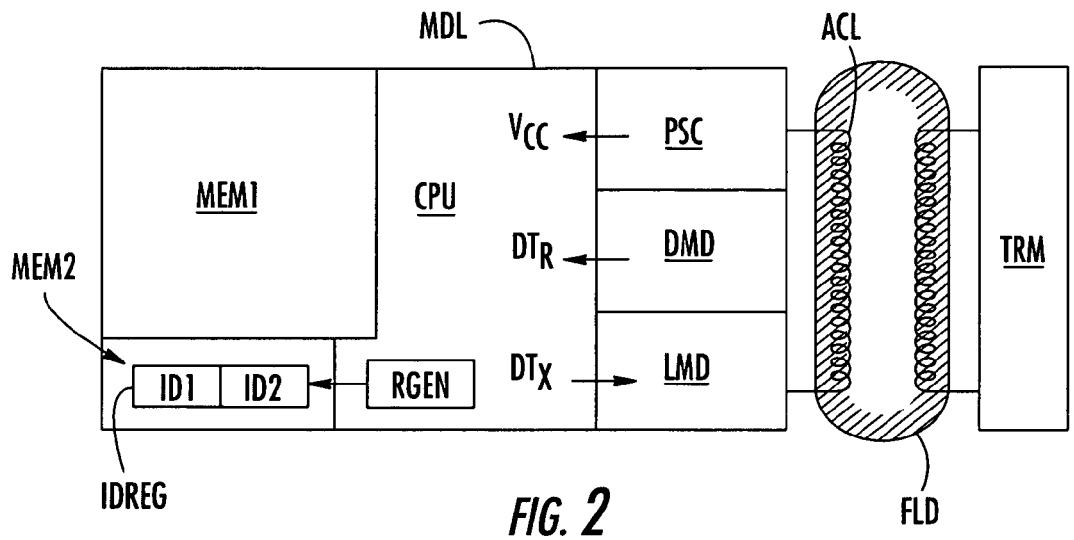
FIG. 2 is a schematic block diagram of a module for implementing an anti-collision method according to the present invention.

Turning now to FIG. 2, a contactless module MDL is illustratively shown for implementing the anti-collision method according to the present invention. The module includes a central processing unit CPU, a non-volatile type memory area MEM1 (such as an EPROM or EEPROM, for example), a volatile memory MEM2 (e.g., RAM) and a communications interface equipped with an antenna coil ACL. When the module is placed into an alternating magnetic field FLD generated by a terminal TRM, an alternating voltage Vi is present at the terminals of the antenna coil. The voltage Vi oscillates at the carrier frequency of the magnetic field.

The memory area MEM1 includes, for example, 128 blocks of 32 bits each. The memory area MEM2 includes various conventional registers used by the CPU, which are not shown in FIG. 2 (except for a register IDREG). The register IDREG includes an identification number of the module, or ID number, here including two parts ID1, ID2. The part ID1 includes, for example, the most significant bits of the ID number, and the part ID2 includes the least significant bits. In the example below, both parts ID1, ID2 each include four bits, although other numbers of bits may also be used. The ID numbers will also be expressed in hexadecimal notation, the ID numbers ranging from 00 (8 bits on 0) to FF (8 bits on 1, i.e. 256 in base 10).

According to the present invention, the register IDREG is linked to the output of a random number generator RGEN, here a generator of 4 bits that is easy to implement and that occupies a small silicon surface area. The generator RGEN is used by the central processing unit to generate, prior to a communication, the parts ID1, ID2 of a random ID number. The ID number is generated when the module is activated by the magnetic field FLD and switches-to-a state READY, as will be described below.

Furthermore, the central processing unit CPU uses the generator RGEN to generate a new part ID2 when it responds to a general or complementary identification request corresponding to a command PCALL16, which will also be described below. Again according to the present invention, the central processing unit, in response to such an identification request, chooses a time slot that is equal to the part ID2 of the ID number.

The communication interface of the module includes a power supply circuit PSC, a demodulator DMD, and a modulator LMD. The circuit PSC delivers a supply voltage Vcc of the module, which is obtained by rectifying the induced voltage Vi. The demodulator DMD extracts data $DT_R$ sent by the terminal TRM from the induced voltage Vi. This data is generally sent by modulating the amplitude of the magnetic field and is, for example, encoded using amplitude shift keying (ASK) modulation.

The modulator LMD sends data DTx by charge modulation of the antenna coil. The data DTx is, for example, encoded by phase shift keying (PSK) modulation (e.g., BPSK) by a sub-carrier extracted from the carrier of the magnetic field. By way of example, the carrier may be 13.56 MHz, and the sub-carrier 847 KHz. The flow of data obtained is in this case in the order of 100 Kbits/s. The unit CPU may be a microprocessor or hard-wired logic device (i.e., sequencer), and it decodes and processes messages (i.e., commands) sent by the terminal. It also sends messages (i.e., responses) to the terminal, as well as performing steps or instructions specific to the anti-collision method according to the present invention.

Figure 3:
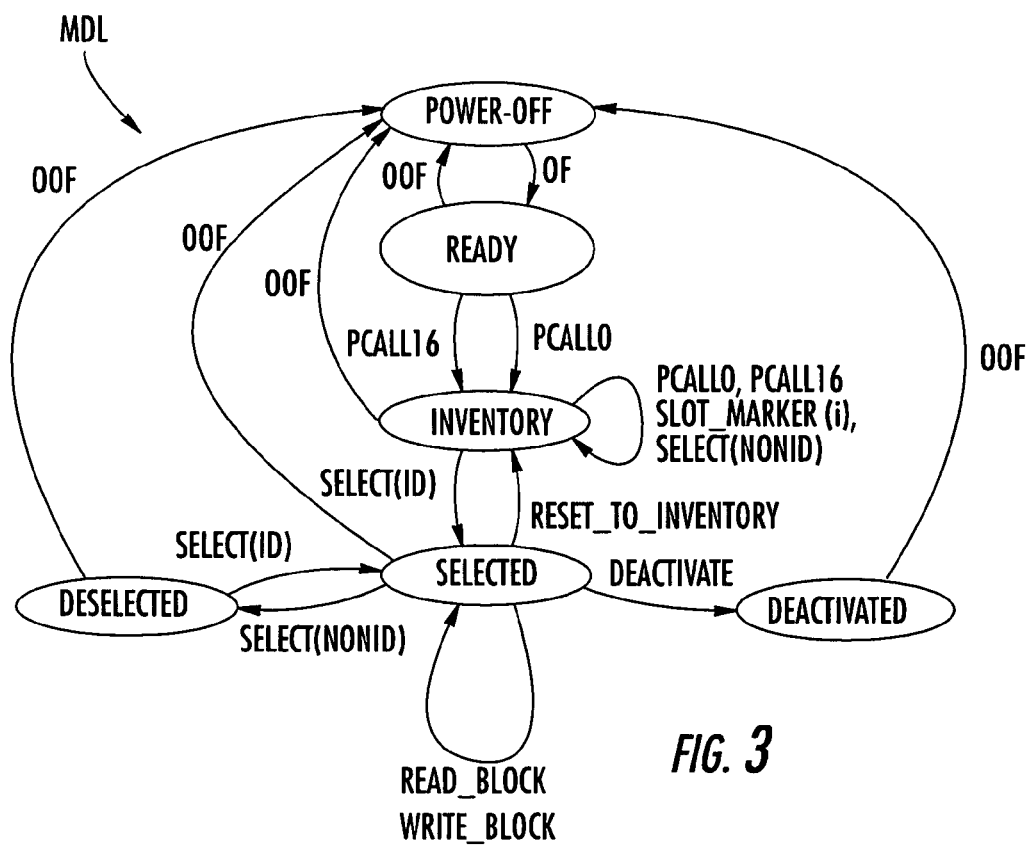
FIG. 3 is a state diagram illustrating operation of the module of FIG. 2.

Referring now to FIG. 3, operation of the module MDL will now be described. Such operation involves six states respectively designated POWER-OFF, READY, INVENTORY, SELECTED, DEACTIVATED and DESELECTED. It also utilizes several commands sent by the terminal, namely: PCALL0; PCALL16; SLOT-MARKER(i); SELECT(ID); SELECT(NONID); DEACTIVATE; READ-BLOCK; and WRITE-BLOCK. These commands, and corresponding responses R(ID) and R-READ-BLOCK sent by the module, are described in greater detail below.

Transitions between the various states of the module are also determined by events designated OF and OOF. The event OF ("on field") corresponds to the case in which the module enters the induction perimeter of the magnetic field FLD. The module then goes from the state POWER-OFF to the state READY as the circuit PSC delivers the voltage Vcc when the alternating voltage Vi appears at the terminals of its antenna coil.

The event OOF ("out of field") corresponds to the case in which the module leaves the induction perimeter of the magnetic field sent by the terminal. The module, if it is active and is in one of the states READY, INVENTORY, SELECTED, DESELECTED or DEACTIVATED, is no longer electrically supplied by the circuit PSC due to the disappearance (or the insufficient value) of the induced voltage Vi. The module then returns to the state POWER-OFF.

When the module switches to the state READY, it generates a random ID number and waits for a command PCALL0 or PCALL16 to switch to the state INVENTORY. It should be noted here that the command PCALL0 is optional within the framework of the present invention as it is not an anti-collision command, as all the modules preferably identify themselves simultaneously. This command is provided to avoid triggering the anti-collision process when a single module is present. Therefore, in one variation, the change from the state READY to the state INVENTORY can be linked to receiving the command PCALL16 only. Conversely, provision can be made for the change from the state READY to the state INVENTORY to be exclusively linked to receiving the command PCALL0. In this case, in the event of a collision, the anti-collision process is only triggered as of the state INVENTORY.

Figure 4:
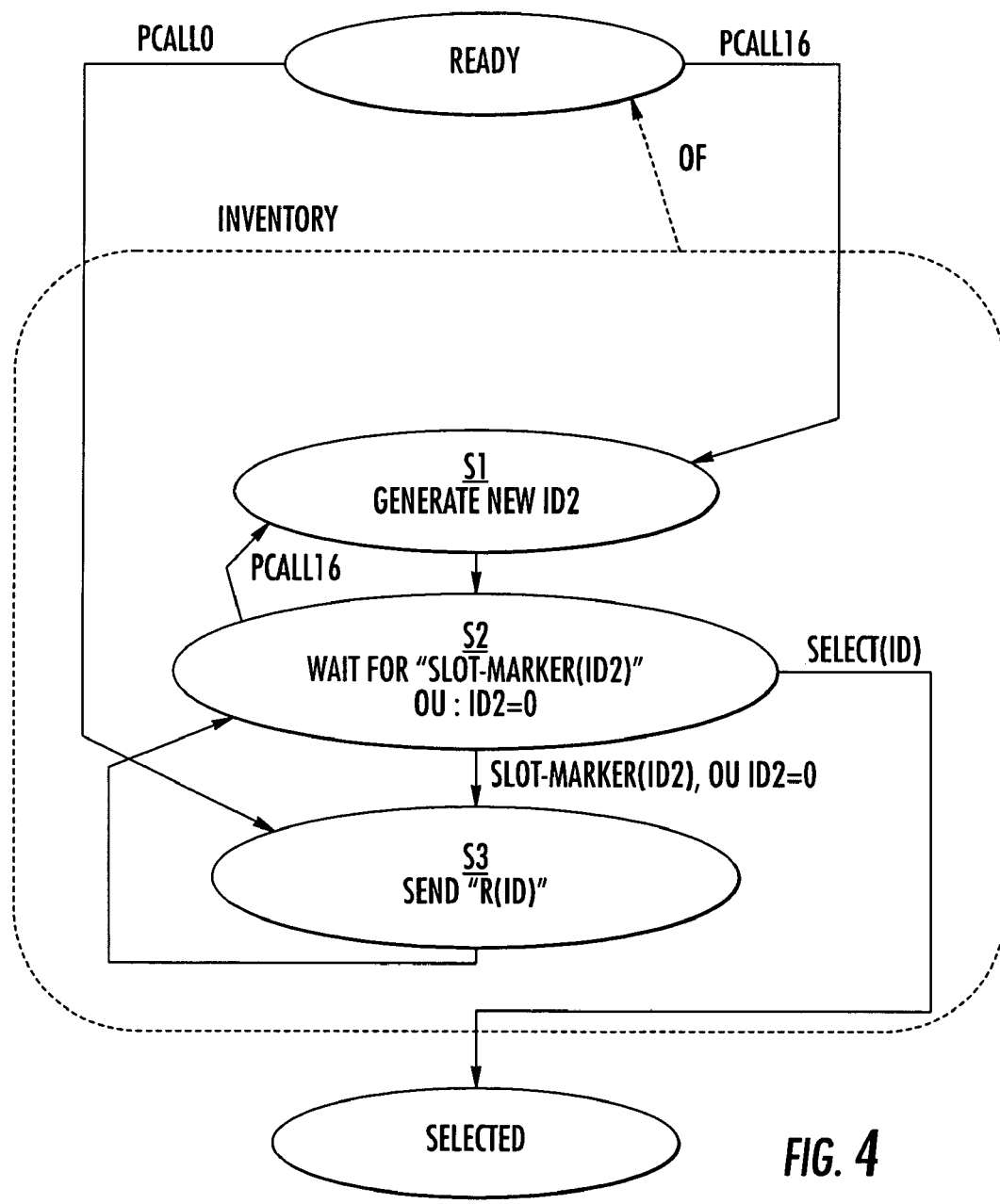
FIG. 4 is a flow chart illustrating the operation of the module of FIG. 2 in a predetermined state from among the various states represented in FIG. 3.

When the module switches to the state INVENTORY, it carries out a certain number of actions which are illustrated in the flow chart of FIG. 4. If the change to the state INVENTORY is triggered by receiving a command PCALL0, the module goes directly to a step S3 in which it sends an identification message. Here, the ID message takes the form of a response R(ID) including its ID number. After the step S3, the module goes to a step S2. If the change to the state INVENTORY is triggered by receiving a command PCALL16, the module goes directly to a step S1 in which it generates a new part ID2 of its ID number by the random generator RGEN. The module then goes to the step S2.

In the step S2, the module waits for a marking command SLOT-MARKER(i) with i=ID2, i.e., the command SLOT-MARKER(ID2) that marks the time slot corresponding to the part ID2 of the ID number of the module. When the command SLOT-MARKER(ID2) is received, the module goes to the step S3 where it sends a response R(ID) and then returns to the step S2.

In the present embodiment in which the command PCALL16 forms a marking command of the first time slot, the module goes directly from the step S2 to the step S3 if part ID2 of its ID number is equal to 0, as the part ID2 then corresponds to the first time slot. The step S2 is also a step of awaiting selection in which the module remains (or comes back) until a command SELECT(ID) including its ID number is received.

When this command is received, the module switches to the state SELECTED. The module may also receive a new command PCALL16 when it is at the step S2. In this case the module returns to the step S to generate a new part ID2 of its ID number, and then returns to the step S2.

Once the module switches to the state SELECTED, the module no longer responds to immediate identification requests PCALL0 or to general or complementary identification requests PCALL16. The memory area MEM1 of the module may be read or written by the terminal by the commands READ-BLOCK or WRITE-BLOCK. In response to the command READ-BLOCK, the terminal receives a response R-READ-BLOCK. If the module receives a command SELECT(NONID), i.e., a command SELECT(ID) including an ID number that is not its own, the module switches to the state DESELECTED. If the module receives a command DEACTIVATE, it switches to the state DEACTIVATED.

In the state DESELECTED, the module does not respond to any command except a command SELECT(ID) including its ID number, which causes it to come back to the state SELECTED. The disappearance of the magnetic field (event OOF) causes it to come back to the state POWER-OFF. In the state DEACTIVATED, the module does not respond to any command. Only the disappearance of the magnetic field (event OOF) causes it to come back to the state POWER-OFF.

EXAMPLE

An example of an anti-collision sequence according to the present invention will now be described with reference to FIGS. 5A to 5D. It will be assumed for the present example that eight modules according to the present invention, respectively designated TAG1 to TAG8, simultaneously enter the interrogation field of the terminal. The column C0 corresponds to the commands sent by the terminal. The columns C1 to C8 correspond to the responses sent by the modules, the ID numbers generated by the modules, and the states the modules are in. The state POWER-OFF is designated "P-O", the state READY is designated "RDY", the state INVENTORY is designated "INV", the state SELECTED is designated "SEL". The state DESELECTED is designated "DESEL".

The start of the sequence is represented in FIG. 5A. All of the modules are in the state POWER-OFF and have, in their respective registers IDREG, non-specified identification numbers ("xx"). When the magnetic field appears (event OF), the modules switch to the state READY, and each one generates an identification number, respectively 40, 13, 3F, 4A, 50, 48, 52, 7C in the present example.

The terminal sends an immediate identification request PCALL0 in the event that a single module should be located in its interrogation field. The modules switch to the state INVENTORY and simultaneously respond by messages R(ID) including their ID numbers, i.e. R(40), R(13), R(3F), R(4A), R(50), R(48), R(52), and R(7C), respectively. The responses all collide and cannot be read by the terminal. The latter then sends a general identification request PCALL16. Each module calculates a new part ID2 of its ID number while keeping the part ID1. The ID numbers of the modules respectively become, in the present example, 45, 12, 30, 43, 55, 43, 53, and 73.

As the command PCALL16 forms by convention a marking command of the first time slot, the module TAG3 responds to the command PCALL16 by sending a message R(30) as the part ID2 of its identification number is equal to 0 and corresponds to the first time slot. As the response from the module is not colliding with another response, the terminal can read it and sends back a select command SELECT(30) to which the module responds by sending the message R(ID) again. Then the module switches to the state SELECTED.

The terminal then sends the command SLOT-MARKER(1) to which no module responds, then the command SLOT-MARKER(2) to which the module TAG2 responds while identifying itself since the part ID2 of its ID number is equal to 2. The module TAG2 is selected according to the procedure already described, and results in the previously selected module TAG3 switching automatically to the state DESELECTED (see FIG. 3, command SELECT(NONID)).

The terminal then continues to send commands SLOT-MARKER(i) for i ranging from 3 to F. When the command SLOT-MARKER(3) is sent, the modules TAG4, TAG6, TAG7, TAG8 respond simultaneously and cannot therefore be selected. The modules TAG1 and TAG5 respond simultaneously to the command SLOT-MARKER(4) and are not selected either. No module responds on the following time slots ranging from 6 to F. Therefore, at the end of this first anti-collision sub-sequence, only the modules TAG2 and TAG3 have been selected, the module TAG3 being in the state DESELECTED and the module TAG2 in the state SELECTED.

A new anti-collision sub-sequence, shown in FIG. 5B, is triggered by sending the command PCALL16, which is a complementary identification request for the modules still awaiting selection The latter thus generate a new part ID2 of their ID numbers which respectively become, in this example: 40 (TAG1), 41 (TAG4), 53 (TAG5), 42 (TAG6), 50 (TAG7) and 74(TAG8). The modules TAG1 and TAG7 respond simultaneously on the first time slot and cannot be selected.

The module TAG4 is selected on the second time slot marked by the command SLOT-MARKER(1) and the module TAG6 is selected on the third time slot marked by the command SLOT-MARKER(2). The module TAG5 is selected on the fourth time slot marked by the command SLOT-MARKER(3). The module TAG8 is selected on the fifth time slot marked by the command SLOT-MARKER(4). No module responds on the following time slots, namely for i ranging from 5 to F.

Therefore, at the end of this second anti-collision sub-sequence, all the modules with the exception of TAG1 and TAG7 have been selected. Further, they have all switched to the state DESELECTED except for the module TAG8, which is in the state SELECTED.

A third anti-collision sub-sequence, shown in FIG. 5C, is triggered by sending the command PCALL16. The module TAG1 generates an ID number equal to 41 and the module TAG7 generates an ID number equal to 50, the parts ID1 being kept the same, as noted above. The module TAG7 is selected on the first time slot marked by the command PCALL16.

As the module TAG1 is the only one not to be selected, it is the only one to respond on the second time slot, marked by the command SLOT-MARKER(1), and sends the message R(41). However, the terminal does not select it as its ID number (41) has already been chosen by another module, namely the module TAG4 that was selected during the second anti-collision sub-sequence (FIG. 5B). Therefore, the terminal does not send the command SELECT(41) and continues to mark the following time slots until i is equal to F, in the event that other modules should have entered its interrogation field.

A fourth anti-collision sub-sequence, shown in FIG. 5D, is triggered by sending the command PCALL16. The module TAG1 this time chooses an ID number equal to 43 which is not used by any other module. The module TAG1 is therefore selected on the fourth time slot, marked by the command SLOT-MARKER(3). The terminal continues to mark the following time slots, in the event that other modules should be located in its interrogation field.

It will be understood that different variations of the anti-collision sequence just described may be made based upon a given application. Thus, for example, when the module TAG3 is selected during the first sub-sequence (FIG. 5A), the terminal may stop sending marking commands for subsequent time slots and establish a communication with the module TAG3 to read or write data, then cause the module to switch to the state DEACTIVATED.

The terminal may also, after conversing with the module TAG3, leave it in the state SELECTED and continue the anti-collision sequence. In this case, when the terminal sends the command SELECT(12) to select the module TAG2, the module TAG3 automatically switches to the state DESELECTED. That is, with respect to the module TAG3, the SELECT(12) command is a command SELECT(NONID) (see below). The difference between this state and the state DEACTIVATED is that the terminal retains the ability to select the module TAG3 subsequently by sending it the command SELECT(30).

According to yet another variation, the terminal may also send the marking commands in various orders. That is, since the marking commands are under its control, the terminal need not mark the time slots in ascending order. Also, although the general or complementary identification request PCALL16 has been used in the description above to mark the first time slot, a specific command SLOT-MARKER(0) could also be used.

It is also possible for the first part ID1 of the ID number of a module not to be random, and for it to be logged in the memory area MEM1. The part ID1 may also be longer than the part ID2, which is used to determine the time slots. Conversely, time slots can be determined using the complete ID number. In this case, the generation of a new ID number in response to the command PCALL16 may concern the entire ID number, or only one part of the ID number.

Although the present invention has been described above within the framework of the production of inductive-type contactless modules, it will be understood that the method according to the present invention is applicable to various other types of contactless modules, particularly contactless modules for UHF band communications where the terminal sends an electric field instead of a magnetic field.

For ease of reference, the following is a description of the commands sent by the terminal, responses sent back by the modules, and other definitions used in the foregoing description.

A "command" is a message sent by the terminal.

A "response" is a message sent by a module.

"SOF" is a start of frame field.

"EOF" is an end of frame field.

"CODE(COMMAND)" is a code of a command or response, on 4, 8 or 16 bits, in a field of the command or of the response.

"CRCh" and "CRCl" are most significant and least significant bits, respectively, of a CRC-type signature accompanying the commands or the responses, enabling the addressee to detect transmission errors, and particularly enabling the terminal to detect collisions between responses R(ID).

The command PCALL0 is a non-nominative immediate identification request. Modules which execute the command include those in the state READY or INVENTORY (i.e. non-selected modules). The response to this command is that the modules each substantially immediately send an identification message R(ID). A module in the state READY switches to the state INVENTORY, and a module in the state INVENTORY remains in the state INVENTORY, following this command. The following is an exemplary code format for this command:

| SOF | CODE (PCALL0) | CRCl | CRCh | EOF |
|---|---|---|---|---|
| | 8 bits | 8 bits | 8 bits | 8 bits |

The command PCALL16 is a general identification request of non-nominative type or complementary identification request of non-nominative type optionally, it also provides a marking command of the first time slot (i=0). Modules which execute the command includes modules in the state READY or INVENTORY (i.e. non-selected modules). If the command PCALL16 is used as a marking command of the first time slot, the modules having an ID number=0 send back an identification message R(ID). A module in the state READY switches to the state INVENTORY, and a module in the state INVENTORY remains in the state INVENTORY, following this command. The following is an exemplary code format for this command:

| SOF | CODE (PCALL16) | CRCl | CRCh | EOF |
|---|---|---|---|---|
| | 8 bits | 8 bits | 8 bits | 8 bits |

The command SLOT-MARKER(i) is a marking command of a time slot of rank i with "i" specified in the command, and i>0 (for i=0, refer to command PCALL16). Modules executing the command include modules in the state INVENTORY In response to the command, a module sends an identification message R(ID) if the rank "i" is equal to the part ID2 of the ID number of the module. The command has no effect on the state of a module, i.e., a module in the state INVENTORY remains in the state INVENTORY while it does not receive a select command SELECT(ID) including its ID number. The following is an exemplary code format for this command:

| SOF | I | CODE (SLOT-MARKER) | CRCl | CRCh | EOF |
|---|---|---|---|---|---|
| | N bits | 4 bits | 8 bits | 8 bits | |

The command SELECT(ID) is a command for selecting the module for which the ID code is specified in the command (nominative command). Modules executing the command include modules in the state INVENTORY or DESELECTED. The response to the command is that the module targeted by the ID number sends an identification message R(ID) by way of confirmation. The effect of the command on the state of a module is that a module in the state INVENTORY switches to the state SELECTED, and a module in the state DESELECTED returns to the state SELECTED. The following is an exemplary code format for this command:

| SOF | CODE (SELECT) | ID | CRCl | CRCh | EOF |
|---|---|---|---|---|---|
| | 8 bits | 8 bits | 8 bits | 8 bits | |

The command SELECT(NONID) is a select command received (command SELECT(ID)) which includes an ID code that does not correspond to that of the module. Modules reacting to the command include modules in the state SELECTED. There is no response to the command. The effect of the command on the state of a module is that a module in the state SELECTED switches to the state DESELECTED.

The command DEACTIVATE is a command for deactivating a module in the state SELECTED (non-nominative command). Modules executing the command include modules in the state SELECTED. There is no response to the command. The effect of the command on the state of a module is that a module in the state SELECTED switches to the state DEACTIVATED. The following is an exemplary code format for this command:

| SOF | CODE (DEACTIVATE) | CRCl | CRCh | EOF |
|---|---|---|---|---|
| | 8 bits | 8 bits | 8 bits | |

The command RESET-TO-INVENTORY is a command for returning to the state INVENTORY that is intended for a module in the state SELECTED (non-nominative command). Modules executing the command include modules in the state SELECTED. There is no response to the command. The effect of the command on the state of a module is that a module in the state SELECTED returns to the state INVENTORY. The following is an exemplary code format for this command:

| SOF | CODE (RESET-TO-INVENTORY) | CRCl | CRCh | EOF |
|-----|---------------------------|------|------|-----|
|     | 8 bits                    | 8 bits | 8 bits |     |

The command READ-BLOCK is a command for reading a block of N bits in the memory area MEM1, at an address specified in the command (field ADDRESS). Modules executing the command include modules in the state SELECTED. The response to the command is the response R-READ-BLOCK (see below). This command has no effect on the state of a module. The following is an exemplary code format for this command:

| SOF | CODE (READ-BLOCK) | ADDRESS | CRCl | CRCh | EOF |
|-----|-------------------|---------|------|------|-----|
|     | 8 bits            | 8 bits  | 8 bits | 8 bits |     |

The command WRITE-BLOCK is a command for writing a block of N bits (fields DATA1 to DATA4) in the memory area MEM1, at the address specified in the command (field ADDRESS). Modules executing the command include only those modules in the state SELECTED. There is no response to the command, however a verification of writing may be made by the terminal by way of the command READ-BLOCK. There is no effect of the command on the state of a module. The following is an exemplary code format for this command:

| SOF | CODE (WRITE-BLOCK) | ADDRESS | DATA1 | DATA2 | DATA3 | DATA4 | CRCl | CRCh | EOF |
|-----|--------------------|---------|-------|-------|-------|-------|------|------|-----|
|     | 8 bits             | 8 bits  | N/4 bits | N/4 bits | N/4 bits | N/4 bits | 8 bits | 8 bits |     |

Turning now to the responses, the response R(ID) is a response of a module to a command PCALL0, PCALL16, SLOT-MARKER, or SELECT(ID). The response includes the ID number of the module. The following is an exemplary code format for this response:

| SOF | ID     | CRCl   | CRCh   | EOF |
|-----|--------|--------|--------|-----|
|     | 8 bits | 8 bits | 8 bits |     |

The response R-READ-BLOCK is a response of a module to a command READ-BLOCK including a block of N bits (fields DATA1 to DATA4) read in the memory area MEM1 at the address specified in the command. The following is an exemplary code format for this response:

| SOF | DATA1 | DATA2 | DATA3 | DATA4 | CRCl | CRCh | EOF |
|-----|-------|-------|-------|-------|------|------|-----|
|     | N/4 bits | N/4 bits | N/4 bits | N/4 bits | 8 bits | 8 bits |     |

That which is claimed is:

1. A method for communicating between a plurality of contactless electronic modules and a terminal comprising:
   generating respective identification numbers at the plurality of contactless electronic modules;
   sending a general identification request from the terminal to the plurality of contactless electronic modules;
   sending identification messages comprising respective identification numbers from the plurality of contactless electronic modules to the terminal responsive to the general identification request, the contactless electronic modules sending the identification messages during time slots corresponding to respective identification numbers thereof;
   if an identification message is received by the terminal without interference from other identification messages, sending a select message from the terminal to the contactless electronic module from which the identification message was received;
   if identification message interference is detected at the terminal, sending at least one non-nominative complementary identification request from the terminal to the plurality of contactless electronic modules;
   generating new identification numbers at each non-selected contactless electronic module responsive to the at least one non-nominative complementary identification request so that the each non-selected contactless electronic module communicates during a new time slot;
   sending at least one complementary identification message comprising respective new identification numbers from each non-selected contactless electronic module to the terminal during the respective new time slots; and
   sending a select message to each contactless electronic module when a respective complementary identification message is received therefrom without interference from other complementary identification messages.

2. The method of claim 1 wherein generating the identification numbers comprises:
   providing a fixed identifier for each contactless electronic module;
   generating a variable identifier at each contactless electronic module; and
   combining the fixed and variable identifiers for each contactless electronic module to form the identification number thereof.

3. The method of claim 2 wherein generating the new identification numbers comprises:
   generating a new variable identifier at each non-selected contactless electronic module; and
   combining the fixed and new variable identifiers for each non-selected contactless electronic module to form the new identification number thereof.

4. The method of claim 2 wherein the variable identifiers comprise at least one least significant bit of respective identification numbers.

5. The method of claim 2 wherein each contactless electronic module comprises a memory for storing a respective fixed identifier.

6. The method of claim 1 wherein the variable identifiers of the plurality of contactless electronic modules are equal to values of respective time slots.

7. The method of claim 1 wherein generating the identification numbers and the new identification numbers comprises pseudorandomly generating the identification numbers and the new identification numbers.

8. The method of claim 1 wherein the general identification request and the at least one non-nominative complementary identification request have a substantially identical format.

9. The method of claim 1 further comprising detecting whether an identification number received at the terminal for a first contactless electronic module is already in use by a second contactless electronic module prior to sending a select message from the terminal to the first contactless electronic module.

10. The method of claim 1 wherein the terminal has a magnetic field associated therewith, and wherein generating the identification numbers comprises generating the identification numbers when the plurality of contactless electronic modules are positioned within the magnetic field.

11. The method of claim 1 further comprising sending at least one marking command from the terminal to the contactless electronic modules for marking occurrences of the time slots.

12. The method of claim 11 wherein the at least one marking command comprises a respective marking command for marking the occurrence of each time slot; and wherein sending the marking commands comprises sending the marking commands out of order with respect to values of respective time slots.

13. The method of claim 1 wherein the time slots are on a time scale, and wherein the general identification request marks a first time slot on the time scale.

14. The method of claim 1 further comprising delaying sending the at least one non-nominative complementary identification request until all of the time slots have passed.

15. The method of claim 1 further comprising:
prior to sending the general identification request, sending an immediate identification request from the terminal to the plurality of contactless electronic modules; and
sending an identification response from the contactless electronic modules to the terminal substantially immediately upon receiving the immediate identification request.

16. A method for communicating between a contactless electronic module and a terminal comprising:
generating an identification number at the contactless electronic module;
responsive to a general identification request from the terminal, sending an identification message comprising the identification number from the contactless electronic module to the terminal during a time slot corresponding to the identification number,
if a select message is received from the terminal, switching the contactless electronic module to a selected state; and
if the contactless electronic module is not already in a selected state and a non-nominative complementary identification request is received from the terminal, generating a new identification number at the contactless electronic module different than a previous variable identifier and sending a complementary identification message from the contactless electronic module to the terminal comprising the new identification number during a new time slot corresponding to the new identification number.

17. The method of claim 16 wherein generating the identification number comprises generating a variable identifier for the contactless electronic module and combining a fixed identifier for the contactless electronic module with the variable identifier.

18. The method of claim 17 wherein generating the new identification number comprises generating a new variable identifier and combining the new variable identifier with the fixed identifier.

19. The method of claim 17 wherein the variable identifier is equal to a value of the time slot, and wherein the new variable identifier is equal to a value of the new time slot.

20. The method of claim 16 wherein generating the identification number and new identification number comprises pseudorandomly generating the identification number and the new identification number.

21. The method of claim 16 wherein the terminal has a magnetic field associated therewith, and wherein generating the identification number comprises generating the identification number when the communications interface is positioned within the magnetic field.

22. A contactless electronic module for communicating with a terminal and comprising:
a communications interface for exchanging signals with the terminal; and
a processor connected to said communications interface for
generating an identification number for the contactless electronic module,
responsive to a general identification request from the terminal, cooperating with said communications interface to send an identification message comprising the identification number to the terminal during a time slot corresponding to the identification number,
if a select message is received from the terminal, switching to a selected state, and
if the processor is not already in a selected state and a non-nominative complementary identification request is received from the terminal, generating a new identification number different than a previous variable identifier and cooperating with said communications interface to send a complementary identification message to the terminal comprising the new identification number during a new time slot corresponding to the new identification number.

23. The contactless electronic module of claim 22 further comprising a decoder connected to said communications interface and said processor for decoding signals received from the terminal.

24. The contactless electronic module of claim 22 wherein said processor generates the identification number by generating a variable identifier for the contactless electronic module and combining a fixed identifier for the contactless electronic module with the variable identifier.

25. The contactless electronic module of claim 24 wherein said processor generates the new identification number by generating a new variable identifier and combining the new variable identifier with the fixed identifier.

26. The contactless electronic module of claim 24 wherein the variable identifier is equal to a value of the time slot, and wherein the new variable identifier is equal to a value of the new time slot.

27. The contactless electronic module of claim 24 further comprising a memory for storing the fixed identifier.

28. The contactless electronic module of claim 22 wherein said processor pseudorandomly generates the identification number and the new identification number.

29. A contactless communications system comprising:
- a terminal and a plurality of contactless electronic modules for communicating therewith;
- each contactless electronic module generating a respective identification number;
- said terminal sending a general identification request to said plurality of contactless electronic modules;
- said plurality of contactless electronic modules sending identification messages comprising respective identification numbers to said terminal responsive to the general identification request and during time slots corresponding to respective identification numbers thereof;
- if an identification message is received by said terminal without interference from other identification messages, said terminal sending a select message to said contactless electronic module from which the identification message was received;
- if identification message interference is detected at said terminal, said terminal sending at least one non-nominative complementary identification request to said plurality of contactless electronic modules;
- each non-selected contactless electronic module generating new identification numbers responsive to the at least one non-nominative complementary identification request so that the each non-selected module communicates during a new time slot;
- said non-selected contactless electronic modules sending at least one complementary identification message comprising respective new identification numbers to said terminal during the respective new time slots;
- said terminal sending a select message to each contactless electronic module when a respective complementary identification message is received therefrom without interference from other complementary identification messages.

30. The system of claim 29 wherein each contactless electronic module generates a respective identification number by generating a variable identifier and combining a fixed identifier therewith.

31. The system of claim 30 wherein each non-selected contactless electronic module generates a respective new identification number by generating a new variable identifier and combining the new variable identifier with the fixed identifier.

32. The system of claim 30 wherein the variable identifiers of the plurality of contactless electronic modules are equal to values of respective time slots.

33. The system of claim 29 wherein said plurality of contactless electronic modules pseudorandomly generate respective identification numbers and new identification numbers.

34. The system of claim 29 wherein said terminal detects whether a received identification number for a first contactless electronic module is already in use by a second contactless electronic module prior to sending a select message to said first contactless electronic module.

35. The system of claim 29 wherein said terminal sends at least one marking command to said plurality of contactless electronic modules for marking occurrences of the time slots.

36. The system of claim 35 wherein the at least one marking command comprises a respective marking command for marking the occurrence of each time slot; and wherein said terminal sends the marking commands out of order with respect to values of respective time slots.

* * * * *

UNITED STATES PATENT AND TRADEMARK OFFICE
CERTIFICATE OF CORRECTION

PATENT NO. : 7,053,754 B2  Page 1 of 1
APPLICATION NO. : 10/453454
DATED : May 30, 2006
INVENTOR(S) : Mani It is certified that error appears in the above-identified patent and that said Letters Patent is hereby corrected as shown below:

Column 2, Line 6      Delete: "specified In"
                      Insert: -- specified.  In --

Column 2, Line 50     Delete: "are"
                      Insert: -- area --

Column 4, Lines 3-4   Delete: "identification – request –"
                      Insert: -- indentification request --

Column 6, Line 61     Delete: "switches-to-a"
                      Insert: -- switches to a --

Column 8, Line 34     Delete: "S"
                      Insert: -- S1 --

Column 9, Line 60     Delete: "selection The"
                      Insert: -- selection.  The --

Column 12, Line 5     Insert: -- . -- between INVENTORY and "In"

Column 14, Line 7     Delete: "contactiess"
                      Insert: -- contactless --

Signed and Sealed this

Thirteenth Day of February, 2007

JON W. DUDAS
*Director of the United States Patent and Trademark Office*

UNITED STATES PATENT AND TRADEMARK OFFICE
CERTIFICATE OF CORRECTION

PATENT NO. : 7,053,754 B2
APPLICATION NO. : 10/453454
DATED : May 30, 2006
INVENTOR(S) : Mani Page 1 of 1

It is certified that error appears in the above-identified patent and that said Letters Patent is hereby corrected as shown below:

| | |
|---|---|
| Column 2, Line 6 | Delete: "specified In"<br>Insert: -- specified.  In -- |
| Column 2, Line 50 | Delete: "are"<br>Insert: -- area -- |
| Column 4, Line 3-4 | Delete: "identification – request –"<br>Insert: -- identification request -- |
| Column 6, Line 61 | Delete: "switches-to-a"<br>Insert: -- switches to a -- |
| Column 8, Line 34 | Delete: "S"<br>Insert: -- S1 -- |
| Column 9, Line 60 | Delete: "selection The"<br>Insert: -- selection.  The -- |
| Column 12, Line 5 | Insert: -- . -- between INVENTORY and "In" |
| Column 14, Line 7 | Delete: "contactiess"<br>Insert: -- contactless -- |

This certificate supersedes Certificate of Correction issued February 13, 2007.

Signed and Sealed this

Fourteenth Day of August, 2007

JON W. DUDAS
*Director of the United States Patent and Trademark Office*